United States Patent
Bheda et al.

[11] Patent Number: 5,990,958
[45] Date of Patent: Nov. 23, 1999

[54] APPARATUS AND METHOD FOR MPEG VIDEO DECOMPRESSION

[75] Inventors: Hemant Bheda; Sanjay Gongalore, both of Cupertino; Partha Srinivasan, Fremont, all of Calif.

[73] Assignee: National Semiconductor Corporation, Santa Clara, Calif.

[21] Appl. No.: 08/877,136

[22] Filed: Jun. 17, 1997

[51] Int. Cl.[6] .................................................. H04N 7/18
[52] U.S. Cl. .......................... 348/407; 348/390; 348/384; 395/200.77
[58] Field of Search .................................. 348/384, 390, 348/405, 423, 461, 464, 845.1, 845.2, 845.3, 407; 364/514 B, 514 C; 395/200.77

[56] References Cited

U.S. PATENT DOCUMENTS

| | | | |
|---|---|---|---|
| 5,768,536 | 6/1998 | Strongin et al. | 348/384 |
| 5,801,775 | 9/1998 | Ueda | 348/402 |
| 5,815,206 | 9/1998 | Malladi et al. | 348/390 |
| 5,818,532 | 10/1998 | Malladi et al. | 348/390 |
| 5,881,244 | 3/1999 | Uchiumi et al. | 348/403 |

*Primary Examiner*—Anand S. Rao
*Attorney, Agent, or Firm*—Steven F. Caserza; Flehr Hohbach Test Albritton & Herbert

[57] ABSTRACT

A novel apparatus and method is disclosed to decode an encoded MPEG video stream in an efficient manner making optimal use of available system memory and computational resources. The present invention partitions the MPEG video decode task into software tasks which are executed by a CPU and hardware tasks which are implemented in dedicated video hardware. Software tasks represent those tasks which do not require extensive memory or computational resources. On the other hand, tasks implemented in dedicated video hardware represent those tasks which involve computational and memory mintensive operations. Synchronization between software tasks executed by the CPU and hardware tasks implemented in dedicated video hardware is achieved by means of various data structures, control structures and device drivers.

10 Claims, 9 Drawing Sheets

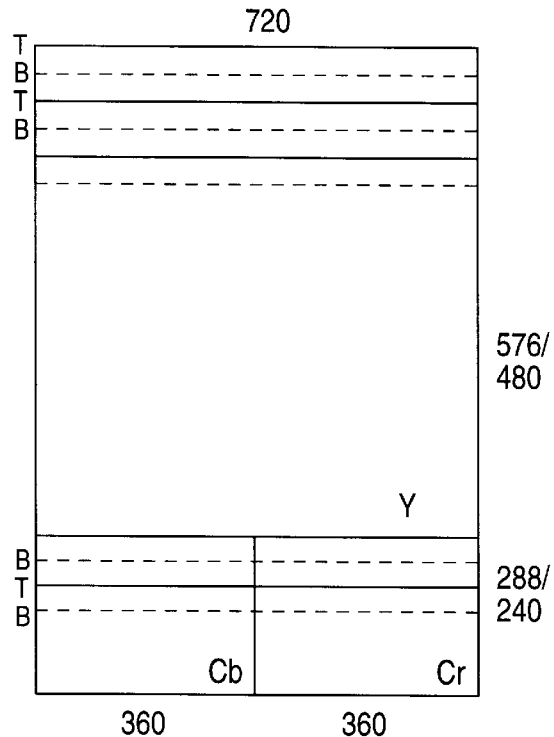
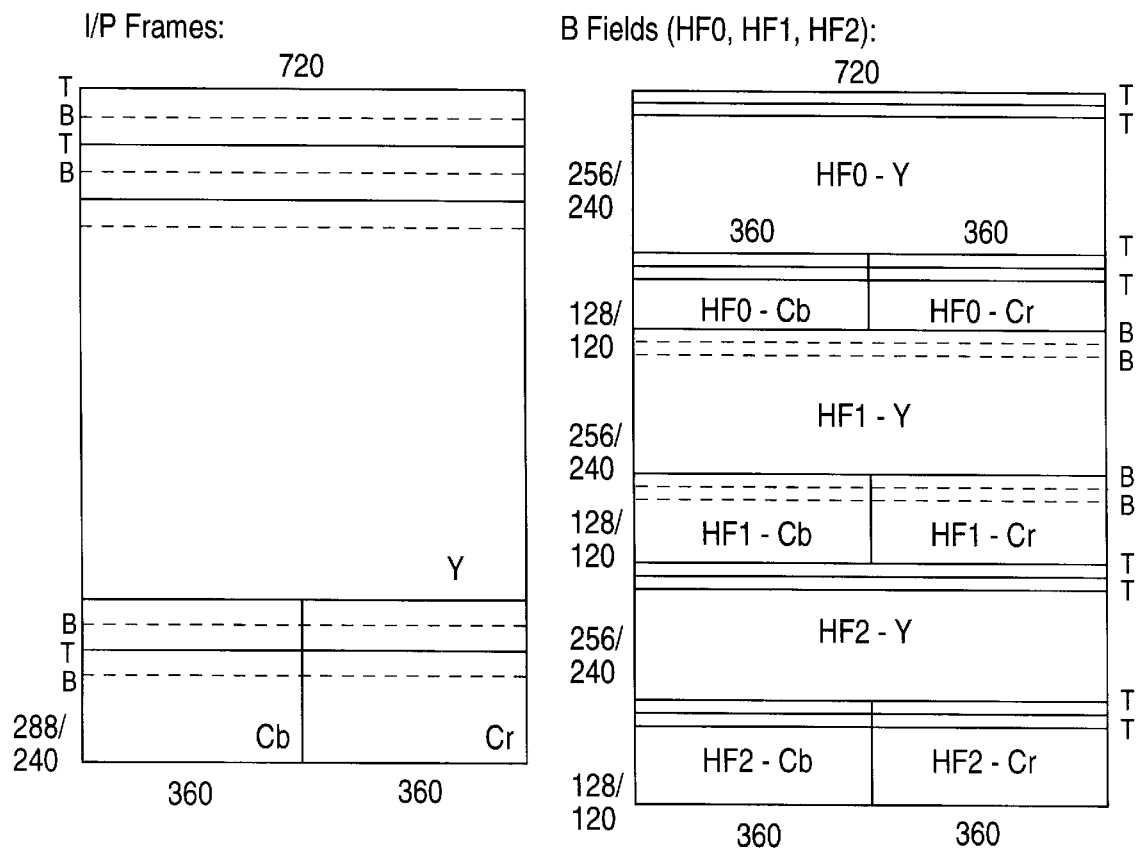
FIG. 9
FIG. 10

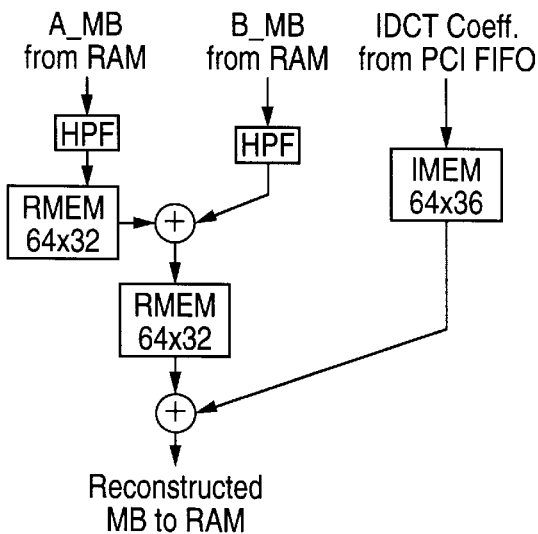
FIG. 14
| load up to 4 IDCT of 8x8 Y block data | | | Write reconstructed Y block to memory |
|---|---|---|---|
| A-REF MC of Y block | B-REF MC of Y block | Wait | |
FIG. 15
| load up to 4 IDCTs of 8x8 Y block data | | Wait | Write reconstructed Y blocks to memory |
|---|---|---|---|
| A-REF MC of Y block | B-REF MC of Y block | | |
FIG. 16
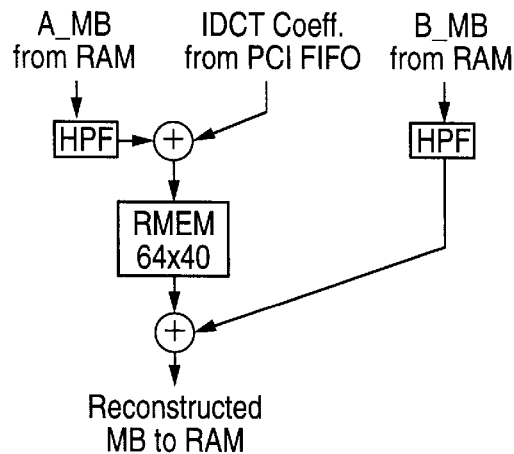
FIG. 17

APPARATUS AND METHOD FOR MPEG VIDEO DECOMPRESSION

TECHNICAL FIELD

This invention pertains to video decompression, and more specifically to a novel apparatus and method to perform MPEG video decode in an efficient manner making optimal use of available system memory and computational resources.

BACKGROUND

The CCITT/ISO committee has standardized a set of compression and decompression algorithms for still and motion digital video, such as is described, for example, in ISO/IEC JTC1/SC29/WG11 N0702 (revised), May 10, 1994. These standards include the JPEG, MPEG and H.261 compression schemes. These standards are commonly applied in video conferencing, CD-ROM or DVD-ROM based interactive videos for education and entertajinent, video or informational kiosks, video on demand (VOD) applications, satellite video transmission applications and many other applications which require communication of motion digital video. These standards utilize transform code compressed domain formats, which include the Discrete Cosine transform (DCT), and the interframe predictive code format. Motion Compensation (MC) algorithms are used in conjunction with the DCT format and other hybrid compressed formats.

The MPEG standard was drafted by the Moving Picture Coding Experts Group (MPEG) which operates within the framework of the Joint ISO/IEC Technical Committee (JCCI) on Information Technology. The draft provided a standard for coded representation of moving pictures, audio and their combination.

FIG. 1 is a block diagram depicting a typical prior art computer system suitable for decoding MPEG video data. Computer system 10 includes standard system components, such as system bus 11, CPU 12, core logic 13, system memory 14, and hard disk 16. Computer system 10 also includes a number of elements particularly suitable for video functions, including DVD-ROM drive 15, which reads CD-ROM or DVD-ROM, MPEG decoder 17 and its associated local DRAM memory 17A, 2D/3D Graphics Controller 18, and its associated local frame buffer DRAM 18A. If desired, computer system 10 also includes a television interface 19 for displaying video on a television, and RGB output bus for providing video output signals to a monitor. These video output signals on bus 20 are either MPEG data streams from DVD-ROM drive 15, or typical computer graphics generated by Graphics Controller 18, or both. Graphics Controller 18 also provides 2-D, 3-D graphics functionality as well as video scaling and color space conversion. In addition, Graphics Controller 18 provides an interface via bus 20 to a RGB monitor or a television serving to display video data from computer system 10.

In FIG. 1, decoder 17 performs MPEG video data stream decompression/decoding operation, thus enabling computer system 10 to playback multimedia applications utilizing the MPEG 1 or MPEG 2 video compression standard. The MPEG video decoding operation includes the tasks of parsing the compressed video stream using variable length decoding (VLD), inverse quantization (IQ), inverse discrete cosine transformation (IDCT), motion compensation (MC) and block reconstruction (BR). Since the video decoding operation involves compute intensive signal processing operations, the hardware logic embedded in MPEG decoder 17 is complex and consequently expensive. Another disadvantage of the prior art setup is that MPEG decoder 17 fails to utilize computational and memory resources provided by system components such as CPU 12, system memory 14, or Graphics Controller 18 and its associated memory 18a. This results in inefficient utilization of the available system resources.

SUMMARY

In view of the foregoing, it is an objective of the present invention to provide an apparatus and method to perform MPEG video decompression in an efficient manner. It is also an objective of the present invention to provide a video decompression apparatus and method which not only performs efficient MPEG video decoding but is also architecturally simpler than prior art video decoders and is cheaper than prior art video decoders. It is a further objective of the present invention to provide an apparatus and method to perform video decoding while optimizing the use of system resources, including computational and memory system resources.

The present invention achieves the above goals and objectives by providing a novel apparatus and method which partitions the MPEG video decode task into software tasks which are executed by a CPU and hardware tasks which are implemented in dedicated video hardware. Software tasks represent those tasks which do not require extensive memory or computational resources. On the other hand, tasks implemented in hardware represent those tasks which involve computational and memory intensive operations. Software tasks pre-process the input encoded MPEG video data stream and write the pre-processed information for each frame into a symbol stream which is stored in system memory. Dedicated video hardware retrieves the symbol stream data from system memory and completes the processing of the video frame. Synchronization between software tasks executed by the CPU and hardware tasks implemented in dedicated video hardware is achieved by means of various data structures, control structures maintained by software and by device drivers associated with dedicated video hardware.

BRIEF DESCRIPTION OF THE DRAWINGS

Additional features of the invention will be readily apparent from the following detailed description and appended claims when taken in conjunction with the drawings, in which:

FIG. 9 depicts the structure for one embodiment of the frame buffer for storing four frames for PAL/NTSC picture resolution.

FIG. 10 depicts an embodiment of the frame buffer structure for storing 3.5 frames for PAL/NTSC picture resolution in accordance with the teachings of the current invention.

FIG. 14 depicts a data flow diagram of decode operations performed by hardware.

FIG. 15 depicts luminance block operations performed by an embodiment of the current invention.

FIG. 16 depicts luminance block operations performed by an embodiment of the current invention.

FIG. 17 depicts an alternate data flow diagram of decode operations performed by hardware.

DESCRIPTION OF SPECIFIC EMBODIMENTS

In accordance with the teachings of this invention, a novel video decompression architecture and method are taught which allow for a low cost implementation of a compressed video playback system. In particular, the current invention provides an efficient and low cost architecture and method for playback of MPEG 1 and MPEG 2 video data streams in a multimedia computer system supporting DVD, DVB, VideoCD and other applications utilizing the MPEG video compression standard.

Figure 1:
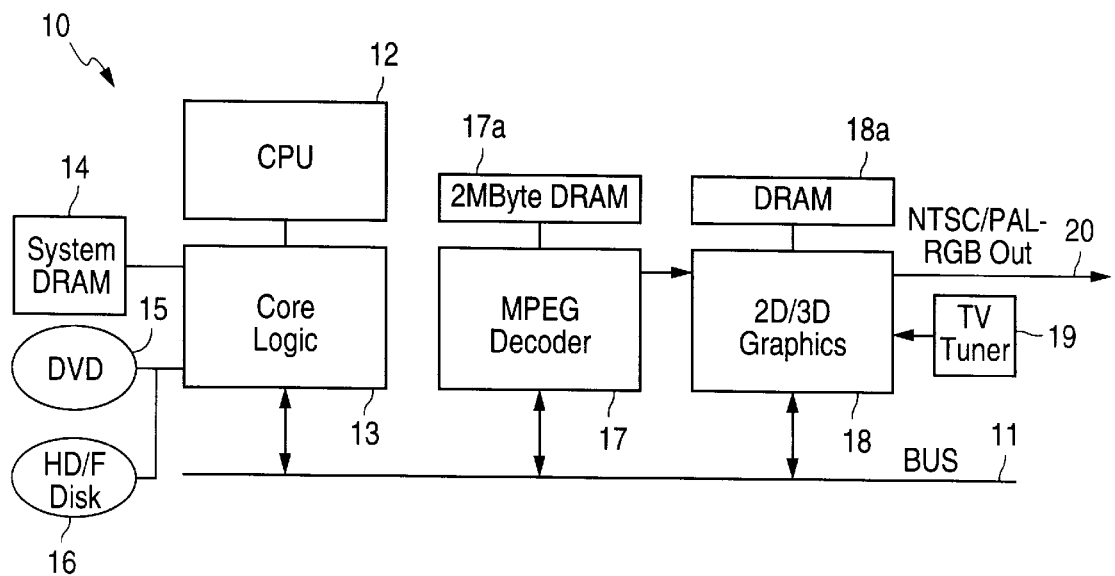
FIG. 1 is a block diagram depicting a typical prior art computer system suitable for decoding MPEG video data.
Figure 2:
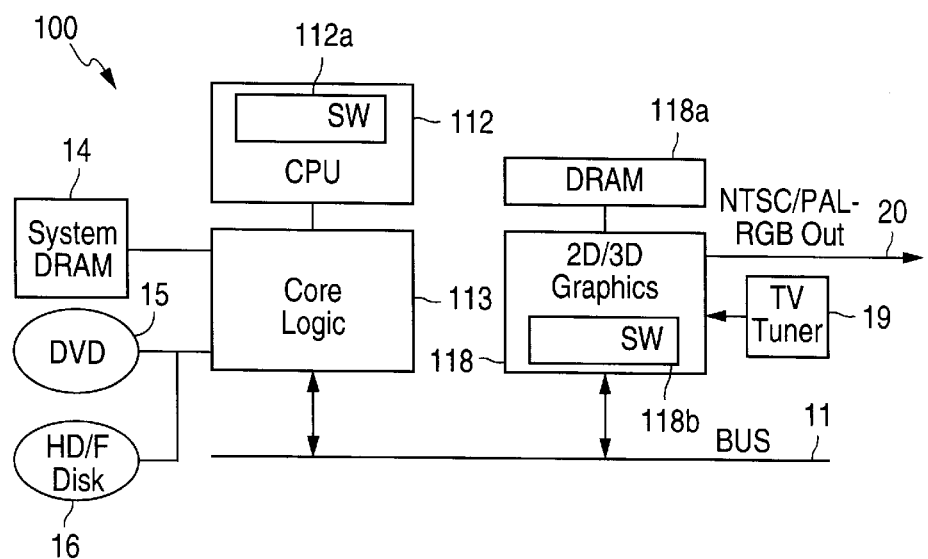
FIG. 2 is a block diagram depicting an embodiment of the current invention suitable for decoding MPEG video data.

FIG. 2 is a block diagram depicting an embodiment of a computer system constructed in accordance with the teachings of the present invention. Unlike the prior art video decoding system of FIG. 1 which utilizes a dedicated MPEG decoder 17, in accordance with the teachings of the present invention, the video decoding task heretofore performed by MPEG decoder 17 is partitioned into a software task 112a running on CPU 112, and tasks performed by novel dedicated video hardware 118b. In one embodiment, as shown in FIG. 2, dedicated video hardware 118b is embedded in graphics controller 118.

The novel architecture and method taught by the invention provide several advantages and improvements over prior art video decoders. Since the decoding task is partially implemented by software task 112a executing on CPU 112, the complexity of dedicated video hardware 118b required to complete the video decode task is greatly reduced. Reduced complexity translates to smaller physical size of the decoder hardware and thus savings in space and cost.

If desired dedicated video hardware 118b can be embedded in graphics controller 118 (as shown in FIG. 2), thereby saving significant amount of integrated circuit real estate. This configuration also allows efficient use of available system resources as the video decoding hardware shares the memory controller and PCI bus interfaces with graphics controller chip 118. Additionally, unlike prior art systems in which MPEG decoder 17 requires its own separate dedicated local memory 17A to decode video frames, in the current invention no additional memory is required as memory required to decode video frames is shared with the graphics controller frame buffer 118A. This translates to savings in cost and results in a more efficient utilization of available memory resources, thus reducing the complexity and cost of the overall system. Furthermore, distribution of the decoding tasks between CPU 112 and dedicated video hardware 118b, results in efficient usage of available system computational resources.

DECODE TASK PARTITIONING BETWEEN HARDWARE AND SOFTWARE

Figure 3:
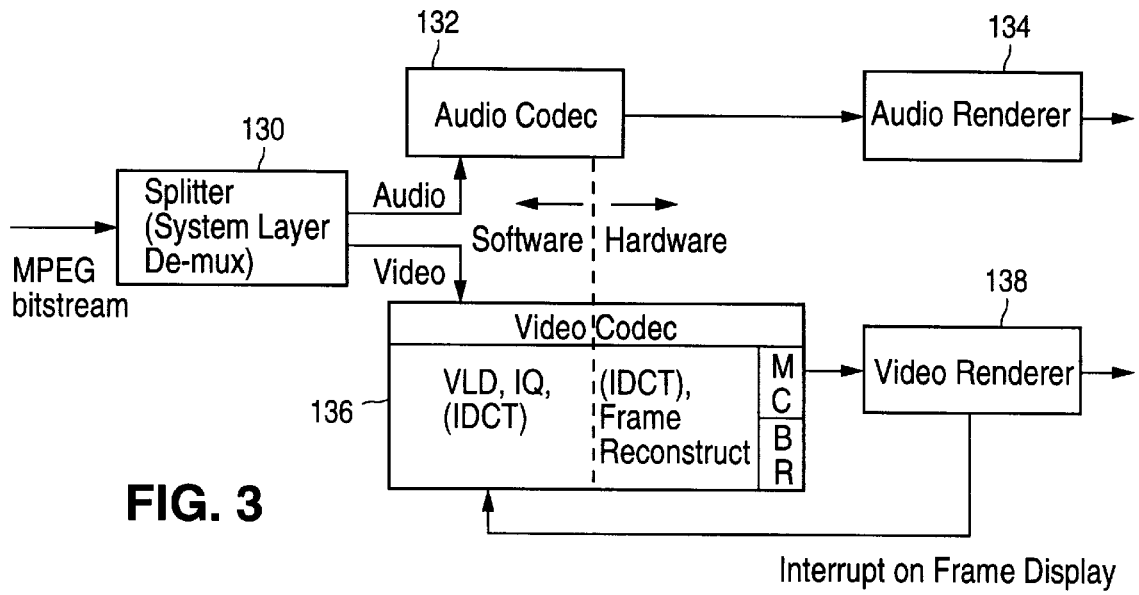
FIG. 3 is a block diagram delineating the tasks involved in decoding a compressed MPEG data stream.

FIG. 3 depicts the various tasks involved in decoding a compressed MPEG signal data stream. The incoming compressed MPEG data stream consists of a video component and an audio component. The multiplexed data-stream is first demultiplexed into its audio and video data-stream components as shown by block 130 in FIG. 3. The audio data-stream is then subjected to audio decoding (block 132) and then forwarded to an audio renderer (block 134) sound card for playback. The video data-stream is subjected to video decoding operation (block 136) and then forwarded to a video renderer (block 138) display device for playback. The video decoding operation (block 136) includes the tasks of parsing the compressed stream using variable length decoding (VLD), performing inverse quantization (IQ), performing inverse discrete cosine transformation (IDCT), performing motion compensation (MC) and block reconstruction (BR).

In accordance with the teachings of this invention, the first step in partitioning the video decode operation between software tasks and tasks performed by novel dedicated video hardware 118b involves identifying tasks which require intensive computational and memory operations and tasks which do not require intensive computational or memory operations. Video decode tasks which do not require intensive memory and computational operations are performed by software executing on CPU 112 while compute/memory intensive tasks are assigned to be performed by dedicated video hardware 118b. Thus, the partitioning of the video decoding operation into software and hardware tasks is dependent upon the performance of CPU 112, system memory 14 bandwidth and available bandwidth on system bus 11, which is for example, a PCI or AGP bus.

Figure 4:
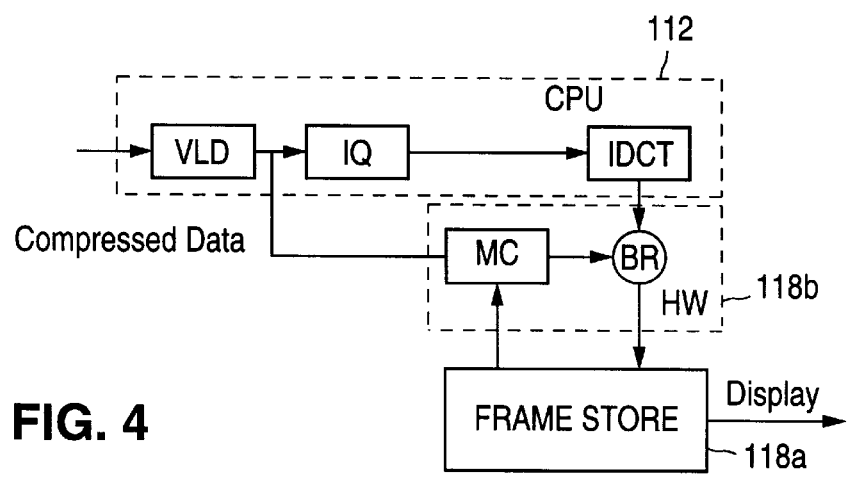
FIG. 4 depicts one technique of partitioning the video decode tasks between software executing on CPU and dedicated video hardware.
Figure 5:
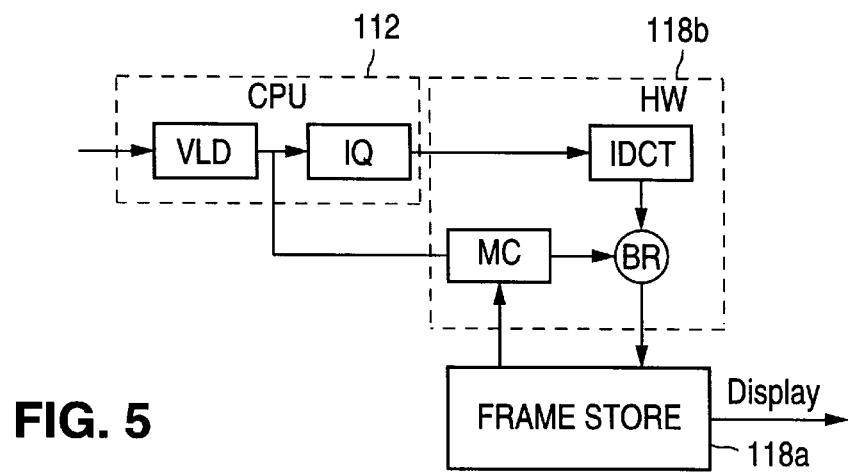
FIG. 5 depicts an alternate technique of partitioning video decode tasks between software executing on CPU and dedicated video hardware.

FIG. 4 and FIG. 5 depict two possible partitioning embodiments based on the CPU performance. In the embodiment depicted in FIG. 4, software tasks executed by CPU 112 include parsing the compressed video bitstream using variable length decoding (VLD), performing inverse quantization of decoded coefficients (IQ), and performing inverse discrete cosine transform (IDCT). The memory intensive tasks of motion compensation (MC) and block reconstruction (BR) are performed by dedicated video hardware 118b.

However, in the embodiment depicted in FIG. 5, the task of performing inverse discrete cosine transformation ADCT) is classified as a compute/memory intensive task and is implemented in dedicated video hardware 118b. As stated above, the partitioning of a particular video decode operation into a software task or hardware task depends on various factors such as the performance of CPU 112, system memory 14 bandwidth and available bandwidth on system bus 11. Consequently, in a particular embodiment, as shown in FIG. 5, the task of performing inverse discrete cosine transformation (IDCT) is classified as a compute/memory intensive task and thus implemented in dedicated video hardware 118b.

The embodiment depicted in FIG. 4 results in higher CPU utilization than the embodiment depicted in FIG. 5. On the other hand, the embodiment depicted in FIG. 5 is more feasible for systems which prefer a reduced compute load on the CPU. It should be evident to those skilled in the art that the partitioning of the video decode task into software and hardware tasks can be customized to suit the compute capabilities of a particular computer system.

In one embodiment, software tasks executing on CPU 112 process the compressed video data stream one frame at a time. CPU 112 partially processes each frame and formats the partially processed frame data as a set of fixed length symbols called the "symbol stream." The symbol stream is stored in a buffer in system memory 14 (shown in FIG. 2) where it can be accessed by dedicated video hardware 118b for further processing. While CPU 112 is processing the next available video frame, dedicated video hardware 118b accesses system memory 14 in a bus mastering mode (without CPU intervention) to retrieve the symbol stream stored for the previously computed frame. Dedicated video hardware 118b interprets the symbol stream generated by CPU 112 and computes the decoded video frame.

As explained above, dedicated video hardware 118b accesses system memory 14 using bus 11 only to retrieve the symbol stream information stored in system memory buffer by CPU 112. All subsequent memory accesses required for the motion compensation (MC) tasks performed by dedicated video hardware 118b are from frame buffer 118a local to dedicated video hardware 118b. Consequently, the partitioning in accordance with the teachings of the current invention not only reduces the compute load on CPU 112, but also greatly reduces system memory 14 bandwidth utilization.

Synchronization between the hardware and software decode tasks is achieved by means of a data structure assembled by software and written in system memory 14. After processing a video frame, software executing on CPU 112 prepares a data structure which stores information pertaining to the partially processed video frame. A pointer to this data structure is written in a Task Pointer FIFO. The Task Pointer FIFO, which resides either in dedicated video hardware 118b or in system memory 14, keeps track of video frames which have been partially processed by CPU 12 and which are ready to be decoded by dedicated video hardware 118b. Software executing on CPU 112 then continues processing the next video frame. Dedicated video hardware 118b, without any CPU intervention, traverses the Task Pointer FIFO and retrieves the symbol stream for the partially processed video frame. Dedicated video hardware 118b then completes decoding of the partially processed video frame. When dedicated video hardware 118b completes decoding and displaying the picture, which may be a frame or a set of fields, it sends an interrupt to CPU 112. Software executing on CPU 112 uses this interrupt to update the pending task entries in the Task Pointer FIFO and also to keep track of the frame last displayed. A more detailed description of the software-hardware communications is described below.

COMMUNICATIONS BETWEEN SOFTWARE AND DEDICATED VIDEO HARDWARE

Figure 6:
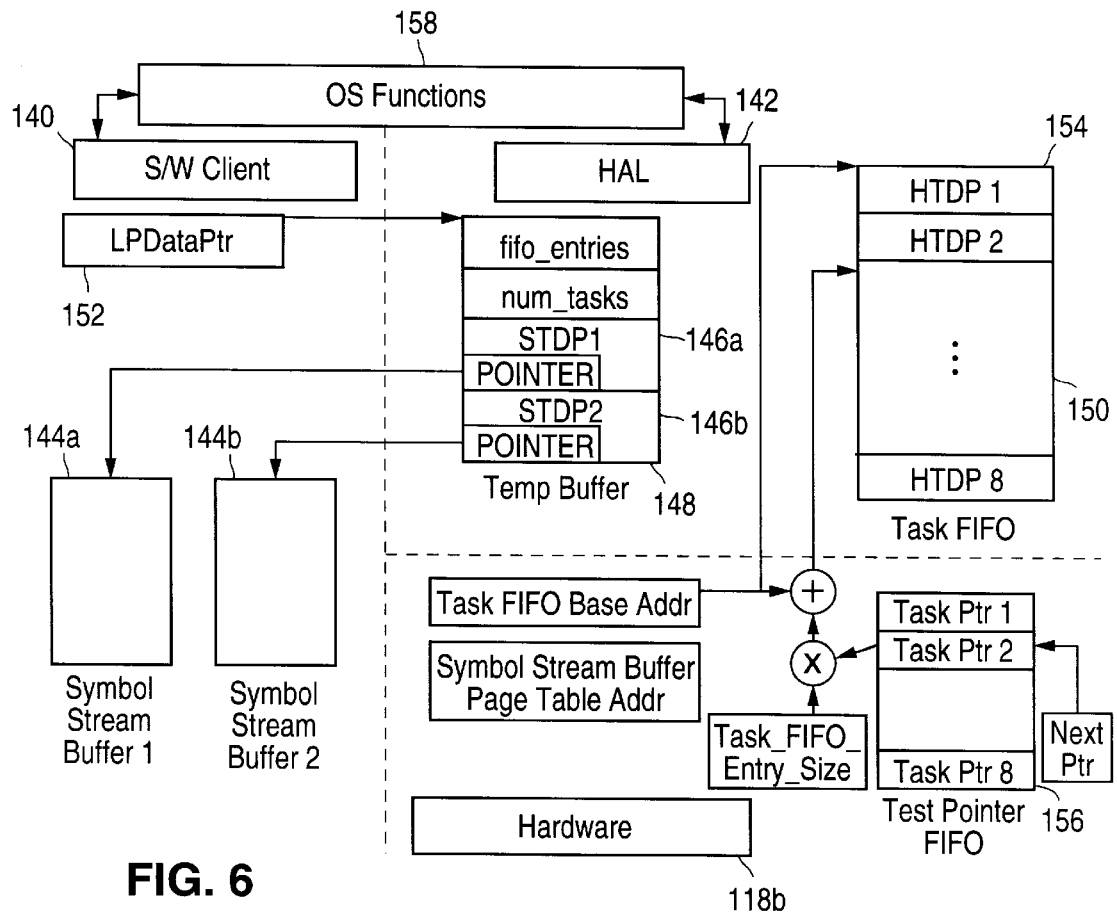
FIG. 6 depicts an embodiment of the current invention depicting the data structures and software/hardware components required for coordinating communication between dedicated video hardware and software running on the CPU to accomplish MPEG video decode.

As briefly described earlier, software executing on CPU 112 partially processes the incoming compressed MPEG video stream and writes the partially processed symbol stream to system memory 14. Dedicated video hardware 118b then accesses the symbol stream to complete the decode process. FIG. 6 shows one embodiment of the data structures and software/hardware components required for coordinating communication between dedicated video hardware 118b and software running on CPU 112 to accomplish MPEG video decode. As shown in the embodiment depicted in FIG. 6, the main components include software executing on CPU 112 called Software Client 140, dedicated video hardware 118b and a Hardware Abstraction Layer (HAL) 142, which acts as a device driver for dedicated video hardware 118b, also executing on CPU 112.

Software Client 140 represents the software executing on CPU 112 and is responsible for partially decoding the input MPEG video data stream. As described earlier, Software Client 140, in one embodiment (shown in FIG. 5), performs compressed video bit-stream parsing, and other video decode tasks such as variable length decoding (VLD) and inverse quantization (IQ), while in an alternate embodiment it also performs inverse discrete cosine transform (IDCT) (shown in FIG. 4). After partially processing the current video frame, Software Client 140 formats the partially processed data in the form of a symbol stream 144a,b. In one embodiment, HAL 142 allocates the necessary buffer area required to store the symbol stream in system memory 14. The symbol stream is written to the allocated buffer space in system memory 14 in buffers 114a,b. Software Client 140 also writes control information for display and decode tasks into a Software Task Definition Packet (STDP). The STDP is stored in buffers 146a, 146b allocated by HAL 142 in system memory 14. Dedicated video hardware 118b uses the symbol stream along with the control information stored in STDP to complete the decode and display of the MPEG video frame. In one embodiment, the STDP specifies source and destination buffer indices, display buffer indices, display duration and VSYNC polarity for interlaced display devices. A virtual address pointer to the symbol stream and the length of the symbol stream buffer is also written into the STDP. IDCT and motion vector information is stored in the symbol stream. It should be noted that other implementations obvious to those skilled in the art are encompassed within the scope of this invention.

HAL 142 acts as a device driver for dedicated video hardware 118b. HAL 142 receives display and decode tasks scheduled by Software Client 140 and makes them available to dedicated video hardware 118b for execution. The tasks performed by HAL 142 include providing a temporary storage area 148 for Software Client 140, maintaining a FIFO of tasks and providing page tables for physical address mapping of symbol stream buffers. HAL 142 also tracks task completion as signaled by an interrupt generated by dedicated video hardware 118b. Additionally, HAL converts the STDP stored in system memory 14 into a Hardware Task Definition Packet (HTDP) in accordance with the specific hardware configuration of the particular system. In one embodiment, the conversion from STDP to HTDP is done during the "release" operation.

HAL 142 utilizes the "acquire" and "release" function calls to coordinate its activities with Software Client 140. Upon an "acquire" finction call, HAL 142 allocates storage buffer for STDP and returns a pointer (LPDataPtr) 150 to STDP to Software Client 140. Software Client 140 performs pre-processing of the compressed MPEG video data stream and fills the STDP data packet. Upon completion of the pre-processing tasks, the "release" function is called. Upon the "release" function being called, HAL translates the STDP to a HTDP structure and updates the Task FIFO count.

HAL 142 allocates storage for and maintains a queue data structure called Task FIFO 150. HAL creates Task FIFO 150 during the initialization phase. Unlike the STDP, Task FIFO 150 is a static data structure and in one embodiment is 4KB long and starts on a page boundary. In one embodiment, Task FIFO 150 created by HAL 142 is at least 8 entries deep. Each entry of Task FIFO 150 contains a HTDP 154 built by HAL 142. As described earlier, HAL 142 derives HTDP 154 from the information supplied in the STDP by Software Client 140. HAL 142 adds ("pushes") entries to Task FIFO 150 when Software Client 140 issues a "release" finction call. HAL 142 removes ("pops") entries from Task FIFO 150 when dedicated video hardware 118b signals a task completion interrupt. There is a one-to-one correspondence between the tasks performed by Software Client 140 and the number of entries in Task FIFO 150. If a one-to-one correspondence is not maintained, it is the responsibility of HAL 142 to accurately track the completion of a task programmed by Software Client 140. The number of entries in Task FIFO 150 reflects the number of tasks issued by Software Client 140 to be completed by dedicated video hardware 118b.

As mentioned above, HAL 142 is responsible for processing STDPs to generate HTDPs 154 that are entered in Task FIFO 150. HAL 142 arranges control data in HTDP 154 such that it can be directly loaded into the registers of dedicated video hardware 118b. HAL 142 also generates page tables for physical mapping of the symbol stream buffer and writes pointers to page tables in the HTDPs. HAL 142 notifies dedicated video hardware 118b that a new task is available by writing the index of HTDP 154 in the Task Pointer FIFO 156 maintained by dedicated video hardware 118b or stored in system memory 14. HAL 142 also determines the appropriate decode storage scheme based on the size of frame buffer 118a (refer to FIG. 2). HAL 142 is also responsible for determining the appropriate Frame Rate and Display Rate based on MPEG stream frame rate and display device, and for scheduling display tasks, including frame repetition to allow a smooth display at 2× or 3× the MPEG frame rate. HAL 142 also tracks task completion interrupts from dedicated video hardware 118b and pops the corresponding entry from Task FIFO 150.

Task Data Structure is a data structure comprising HTDP 154 and the symbol stream 144a,b. It represents the unit of information loaded into dedicated video hardware 118b for each task to be performed. HTDP 154 is hardware implementation dependent and for one embodiment is 4 DWORDS (32 bytes) long. HTDP 154 contains information needed for decode and display tasks, which is loaded into the registers of dedicated video hardware 118b. As described earlier, HAL 142 parses information in the STDP and writes HTDP 154 in Task FIFO 150 during the "release" function call.

As described earlier, symbol stream 144a,b contains partially decoded MPEG video data. Software Client 140 writes the symbol stream buffer as it parses the incoming compressed video data stream. A pointer to this buffer and the buffer length are written into the STDP by the Software Client after an "acquire" function call. HAL 142 creates a page table for the symbol stream buffer during "release" function call to provide the physical address mapping. The base address of this page table is written into HTDP 154 by HAL 142, and loaded by dedicated video hardware 118b when it processes the task.

Figure 7:
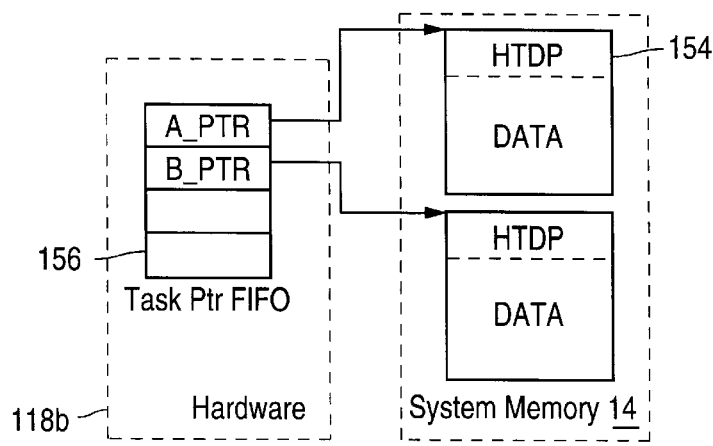
FIG. 7 depicts an embodiment of the current invention in which the Task Pointer FIFO is maintained by the dedicated video hardware.

Task Pointer FIFO 156 resides in dedicated video hardware 118b or in system memory 14. In the embodiment shown in FIG. 7, Task Pointer FIFO 156 is maintained by dedicated video hardware 118b. Each valid entry in Task Pointer FIFO 156 is an index to a task in Task FIFO 150 maintained by HAL 142. In one embodiment, Task Pointer FIFO 56 is 3-bits wide, and at least eight entries deep. Tasks handled by dedicated video hardware 118b include Display only, Decode & Display tasks. This information is stored in the programming parameters contained in HTDP 154. These programming parameters include—decode task type, display task type, display buffer index, frame/field display duration, etc. If "decode" task is specified, hardware 118b reads the symbol stream from system memory 14 in bus mastering mode, interprets the commands, and reconstructs the decoded frames in local frame buffer 118a. Dedicated video hardware 118b indicates the completion of a frame decode & display by generating a task completion interrupt. HAL 142 detects this interrupt and uses it to track the frame currently being displayed and the number of pending tasks.

While dedicated video hardware 118b is processing the current task, CPU 112 prepares the next task, which is programmed when a Task FIFO 150 entry is available. Dedicated video hardware 118b also maintains Status and Control Registers to allow the user better control over the software-hardware communication protocol.

TRANSACTIONS FOR DISPLAY AND DECODE TASKS

Figure 8A:
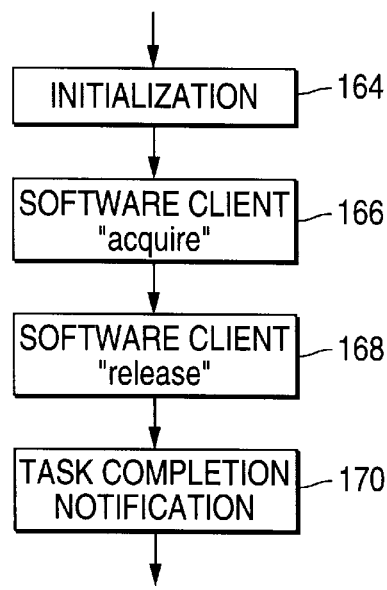
FIG. 8a is a flow chart depicting the various software transactions involved in decode and display of MPEG video.

FIG. 8a depicts the various steps executed by Software Client 140 and by HAL 142 to perform a display/decode task in accordance with one embodiment of the current invention. As shown in FIG. 8a, the first step is the initialization step represented by block 164. At initialization, HAL 142 creates a specific identification number which indicates that it is a motion compensation operation. In one embodiment, this identification number is a code identification of "MMMC". Software Client 140 tests this field to determine whether dedicated video hardware 118b is present in computer system 100. HAL 142 next allocates a 4KB system memory buffer for and creates Task FIFO 150. In one embodiment Task FIFO 150 starts on a 4K boundary. HAL 142 also programs dedicated video hardware registers with task related parameters such as decode storage scheme, display rate for MPEG video, and interrupt control. The start address of Task FIFO 150 and the size of each entry in bytes is written into the Task FIFO Base Address Register in dedicated video hardware 118b. HAL 142 also invokes appropriate operating system functions 158 to set the refresh rate for the display device. Meanwhile, Software Client 140 writes information related to the decode and display tasks. This information includes encoded frame rate, format of inter-block IDCT and motion vector data, and interrupt control parameters.

After successful initialization, Software Client 140 issues an "acquire" request to HAL 142 (represented by block 166 in FIG. 8a). The "acquire" request succeeds if the STDP FIFO has one or more free entries. If the "acquire" succeeds, HAL 142 creates temporary storage buffer (148 in FIG. 6) for STDP and returns a pointer "LPDataPtr" 152 to this buffer. HAL 142 also writes the "fifo_entries" field to specify the number of tasks pending in Task FIFO 150. On a successful return from the "acquire" function, Software Client 140 writes the number of tasks to the "task_count" field, in the STDPs in temporary storage buffer 148 pointed to by pointer "LPDataPtr" 152. Each STDP also has a pointer to the virtual starting address of the symbol stream buffer. In one embodiment, the symbol buffer is initially allocated by HAL 142, in which case, the pointer to the symbol stream buffer is written in the STDP.

Block 168 in FIG. 8a represents the "software client release" operation. Software Client 140 calls the "release" function after coding the next task into the STDP and preparing the symbol stream. After the "release" function is called, HAL 142 converts the STDP control information into HTDP 154 which is in a suitable hardware readable format. HAL 142 also creates page tables for physical address mapping of the symbol stream buffer, using the virtual address pointer and the buffer length information in the STDP. HAL 142 writes a pointer to this page table in the Page Table Pointer register in dedicated video hardware 118b. HAL 142 then notifies dedicated video hardware 118b of the availability of a new task by writing the index of the task into the next available Task Pointer FIFO 156 entry.

Block 170 in FIG. 8a represents the Task Completion Notification step. Upon successful completion of a decode and display task, dedicated video hardware 118b issues an interrupt according to the settings for interrupt control in the Control Register. Serving as an interrupt handler HAL 142 pops the corresponding entries in Task Header FIFO 150 and updates the number of entries in Task FIFO 150 to reflect the correct number of outstanding tasks. This step represents the successful completion of a given decode and display task.

Task Handler for Dedicated Video Hardware

Figure 8B:
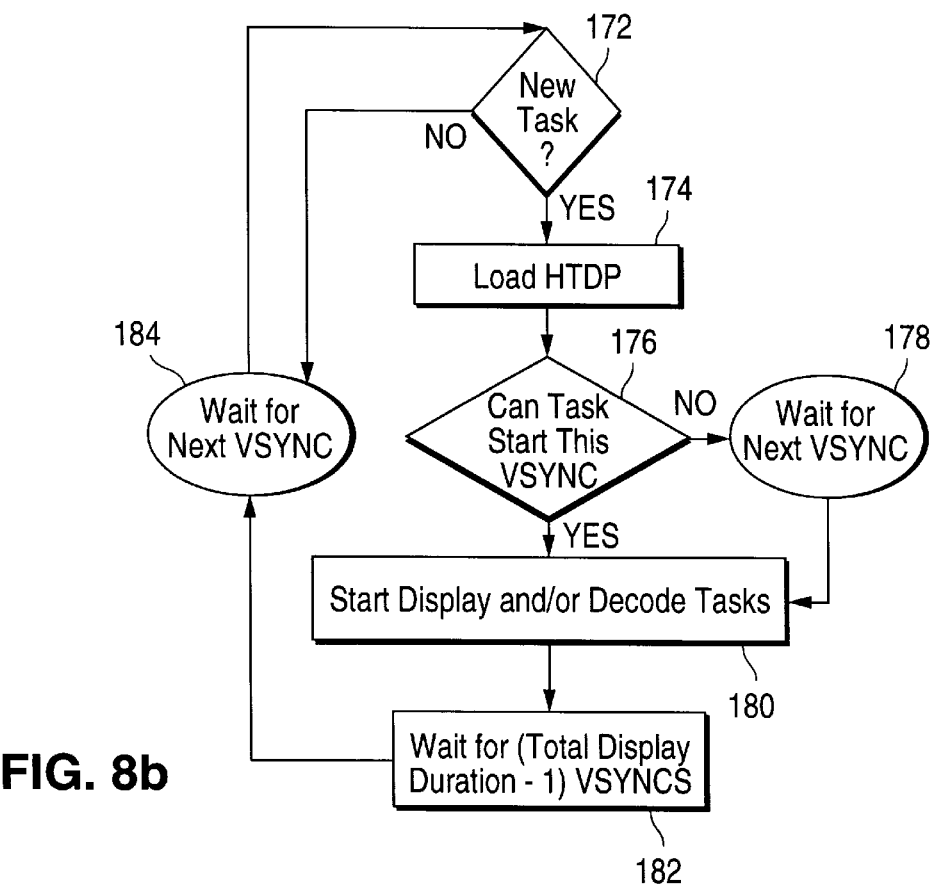
FIG. 8b is a flow chart illustrating the sequence of operations performed by the task handler of the dedicated video hardware.

FIG. 8b illustrates the sequence of operations performed by the task handler of hardware 118b. As shown in FIG. 8b, at step 172 the task handler waits for the current task to complete and then checks if an executable new task is available to start on the next VSYNC. A "new task" is available if Task Pointer FIFO 156 maintained by dedicated video hardware 118b is non-empty. If a new task is available, at step 174, dedicated video hardware 118b calculates the start address of next HTDP, and loads the HTDP. The following equation is used to calculate the start address of the next HTDP:

Next HTDP Start Address=HTDB_Base_Addr+
(Next_Task_Pointer_Value * HTDP_Size)

Next, at step 176, dedicated video hardware 118b determines if the new task is "executable"—a task is executable if the next VSYNC polarity matches the Task Start VSYNC Polarity. If the task is executable, the task handler proceeds with step 180, else at step 178 it waits for the next VSYNC to start the task.

At step 180, the task handler starts the display and/or decode tasks. The task to be executed is scheduled by programming dedicated video hardware 118b registers using information from the HTDP. If Decode is specified, the pointer to the Symbol Stream Buffer Page Table is loaded into the Page Table Pointer Register. The current entry from the Task Pointer FIFO is popped. At steps 182 and 184, the task handler waits for the scheduled tasks to complete, i.e., for the number of VSYNCs equal to the (1st field display duration+2nd field display duration−1). The task handler then proceeds back to step 172.

Dedicated video hardware 118b repeats display of the last frame or field, if the display for next time slice is undefined—either because last decode task did not complete or because the next task has not yet been programmed by software.

SYMBOL STREAM SYNTAX

The Symbol Stream data represents video data that has been pre-processed by the software executing on CPU 112 and is ready to be forwarded to dedicated video hardware 118b for further decoding. The syntax for one embodiment of the symbol stream is described below (for the described embodiment each data element is a 16-bit word):

Symbol Stream Ready for Motion Compensation & Block Reconstruction in Dedicated Video Hardware (corresponding to one embodiment as shown in FIG. 4):

```
NOOP;                    // optional no-op.
PICTURE_START;           // picture start code
if(idct_type=packed)limit=22;
if(idct_type=8-bit signed)limit=32;
if(idct_type=16-bit signed)limit=64;
while (MBLK_TYPE){;      //macroblock header and type info
    if(!intra){
        FRMREF_PTR;      //src pointer info
```

-continued

```
}
if(aMV){        // if 'A' ref or Concealment Vector, 'A' motion vector...
    if(abs_addr){
        A_YBLK_ADDR;       //Luminance block address
    }
    else {
        A_HOFF;
        A_VOFF;
    }
}
if((aMV)&&(2nd_MV)){               //if a 2nd 'A' motion vector...
    if(abs_addr){
        A_YBLK_ADDR_2ND;
    }
    else {
        A_HOFF_2ND;
        A_VOFF_2ND;
    }
}
if(bMV){        //if a backward ('B') motion vector...
    if(abs_addr){
        B_YBLK_ADDR;       //Luminance block address
    }
    else {
        B_HOFF;
        B_VOFF;
    }
}
if((bMV)&&(2nd_MV)){               //if a 2nd 'B' motion vector...
    if(abs_addr){
        B_YBLK_ADDR_2ND;
    }
    else {
        B_HOFF_2ND;
        B_VOFF_2ND;
    }
}
if((~intra)&&(pat)){
        PATTERN;           //macroblock pattern
}
if(intra){               //intra block IDCT data always 8-bit unsigned
    for(i=0;i<6;i++){
        for(p=0;p<32;p++){
            INTRA_BLKDATA[p];
        }                  //end-of-block reached
    }
}//end of intra macroblock data
else {
    if(pat){
        //number of '1' bits in PATTERN FOR Y blocks.
        n=one_count(PATTERN[3:0]);
        for(i=0;i<n;i++){ //block info only for non-zero blocks.
            for(p=0;p<limit;p++){
                INTER_BLKDATA[p];
            }              //end-of-block reached
        }
    }   //end of Y block data
    if((aMV)&&(abs_addr){        //'A' motion vector...
        A_CBLK_ADDR;     //Chrominance block address
    }
    if((aMV)&&(2nd_MV)&&(abs_addr)){
        //if a 2nd 'a' motion vector...
        A_CBLK_ADDR_2ND;
    }
    if((bMV)&&(abs_addr)){       //'B' motion vector...
        B_CBLK_ADDR;
    }
    if((bMV)&&(2nd_MV)&&(abs_addr)){
        //if a 2nd 'B' motion vector...
        B_CBLK_ADDR_2ND;
    }
    if(pat){
        n=one_count(PATTERN[5:4]);
        //number of '1' bits in PATTERN for Cb, Cr blocks.
        for(i=0;i<n;i++){
            for(p=0;p<limit;p++){
                INTER_BLKDATA[p];
            }              //end-of-block reached
        }   //end of block data
}//End of chrominance data
```

```
}//end of non-intra macroblock data
}//end of all macroblocks
PICTURE_END;
```

Symbol Stream Ready for IDCT, Motion Compensation & Block Reconstruction in Dedicated Video Hardware (corresponding to the embodiment illustrated in FIG. 5):

```
NOOP;                    //optional no-op.
PICTURE_START;           //picture start code
while (MBLK_TYPE){;      //macroblock header and type info
    if(!intra){
        FRMREF_PTR;      //src pointer info
    }
    if(aMV){             //if 'A' ref or Concealment Vector, 'A' motion vector...
        if(abs_addr){
            A_YBLK_ADDR;     //Luminance block address
        }
        else{
            A_HOFF;
            A_VOFF;
        }
    }
    if((aMV)&&(2nd_MV)){         //if a 2nd 'A' motion vector...
        if(abs_addr){
            A_YBLK_ADDR_2ND;
        }
        else {
            A_HOFF_2ND;
            A_VOFF_2ND;
        }
    }
    if(bMV){     //if a backward ('B') motion vector...
        if(abs_addr){
            B_YBLK_ADDR; //Luminance block address
        }
        else {
            B_HOFF;
            B_VOFF;
        }
    }
    if((bMV)&&(2nd_MV)){         //if a 2nd 'B' motion vector...
        if(abs_addr){
            B_YBLK_ADDR_2ND;
        }
        else {
            B_HOFF_2ND;
            B_VOFF_2ND;
        }
    }
    if((!intra)&&(pat)){
        PATTERN;                 //macroblock pattern
    }
    if(intra){
        for (i=0;i<6;i++){
            while(!eoblk){
                zlen:coeff;
            }
            eoblk;               //end-of-block reached
        }
    }//end of intra macroblock data
    else{
        if(pat){
        //number of '1' bits in PATTERN for Y blocks
            n=one_count(PATTERN[3:0]);
            for(i=0;i<n;i++){ //block info only for non-zero blocks
                while(!eoblk){
                    zlen:coeff;
                }
                eoblk;           //end-of-block reached
            }    //end of Y block data
        }
        if((aMV)&&(abs_addr){        //'A' motion vector...
            A_CBLK_ADDR;     //Chrominance block address
        }
        if((bMV)&&(2nd_MV)&&(abs_addr)){//if a 2nd 'a' motion vector...
            A_CBLK_ADDR_2ND;
        }
        if((bMV)&&(abs_addr)){       //'B' motion vector...
            B_CBLK_ADDR;
```

-continued

```
        }
        if((bMV)&&(2nd_MV)&&(abs_addr)){//if a 2nd 'B' motion vector...
                B_CBLK_ADDR_2ND;
        }
        if((bMV)&&(2nd_MV)&&(abs_addr)){//if a 2nd 'B' motion vector...
                B_CBLK_ADDR_2ND;
        }
        if(pat){
        //number of '1' bits in PATTERN for Cb, Cr blocks.
                n=one_count(PATTERN[5:4]);
                for(i=0;i<n;i++){ //block info only for non-zero blocks.
                    while(!eoblk){
                        zlen:coeff;
                    }
                    eoblk;      //end-of-block reached
                }
        }        //end of non-intra chrominance data
    }   //end of non-intra macroblock data
}//end of all macroblocks
PICTURE_END;
```

Table 1 provides a description for the various symbols used in the above symbol stream format according to one embodiment of the invention. A 'W' in Table 2 indicates a 16-bit word.

TABLE 1

Symbol Description Table

| SYMBOL | B[15:11] | SIZE | DESCRIPTION |
|---|---|---|---|
| PICTURE_START | 0x15 | 1 w | picture start code:<br>b2: 1 = alternate zigzag scan<br>b1–0: 1 = I, 2 = P, 3 = B frame |
| MBLK_TYPE<br>dp<br>16x8<br>flddct<br>fldpred<br>flddec<br>aMV<br>bMV<br>pat<br>intra | 0x17 | 1 w | Macroblock type word:<br>b9: 1 = dual-prime, 0 = normal<br>b8: 1 = 16x8 Prediction, 0 = normal (Field Decode only)<br>b7: DCT Type: 0 = Frame, 1 = Field.<br>b6: Prediction Type: 0 = Frame, 1 = Field<br>b5: Decode Type: 0 = Frame, 1 = Field<br>b3: 1 = fwd ('A') ref used.<br>b2: 1 = bwd ('B') ref used.<br>b1: 0 = no IDCT block data, 1 = block presence specified by PATTERN word.<br>b0: 1 = intra, all 6 blocks present, 0 = inter, block presence specified by pat bit. |
| FRMREF_PTR | data | 1 w | Reference Frame Pointers, word:<br>b[15:12]: 'A' ref ptr #2<br>b[11:8]: 'B' ref ptr #2<br>b[7:4]: 'A' ref ptr #1<br>b[3:0]: 'B' ref ptr #1<br>In each 4-bit pointer, b3 indicates top/bottom field; and b[2:0] select one of frame stores F0–F3 to be used as reference |
| A_HOFF,A_HOFF_2ND | data | 1 w | forward or 'A' prediction frame, horizontal motion vector. |
| A_VOFF,A_VOFF_2ND | data | 1 w | forward or 'A' prediction frame, vertical motion vector. |
| B_HOFF,B_HOFF_2ND | data | 1 w | backward or 'B' prediction frame, horizontal motion vector. |
| B_VOFF,B_VOFF_2ND | data | 1 w | backward or 'B' prediction frame, vertical motion vector.<br>All are in half-pixel units, 12-bit signed value relative to macroblock upper-left corner. If Field-Decode, the vertical motion vectors are in field-line units, otherwise in frame-line units. |
| A_YBLK_ADDR,<br>A_YBLK_ADDR_2ND | data | 2 w | 30-bit luminance block address offset, half-pixel information |
| B_CBLK_ADDR,<br>B_YBLK_ADDR_2ND | data | 2 w | 30-bit chrominance block address offset, half-pixel information<br><br>b29:0 = block address offset, b30 = horizontal half-pixel, b31 = vertical half-pixel |
| PATTERN | data | 1 w | macroblock block pattern, one bit per block, indicating existence of IDCT coeffs for each block.<br>b5: 1 = coeffs exist for Cr<br>b4: 1 = coeffs exist for Cb<br>b3: 1 = coeffs exist for Y3<br>b2: 1 = coeffs exist for Y2<br>b1: 1 = coeffs exist for Y1<br>b0: 1 = coeffs exist for Y0 |
| INTRA_BLKDATA[p] | data | 1 w | IDCT output of intra block, word:<br>b15–8: element 2p + 1,8-bit unsigned.<br>b7–0: element 2p,8-bit unsigned. |

TABLE 1-continued

Symbol Description Table

| SYMBOL | B[15:11] | SIZE | DESCRIPTION |
|---|---|---|---|
| INTER_BLKDATA[p] | data | 1 w | IDCT output of inner block, format determined by idct_type: |
|  |  | 1 w | idct_type = 8-bit signed —> b15–8:element 2p + 1,b7–0:element 2p |
|  |  | 2 w | idct_type = 16-bit signed —> b15–0:element p |
|  |  |  | idct_type = packed 9-bit signed —> b26–18:element 3p + 1,b17–9:element |
| ZLEN:COEFF | data | 1 w | INVERSE Quantizer Output |
|  |  |  | b15–4: 2's complement iq coeff, IQCOEFF |
|  |  |  | b3–0: zero length ZLEN |
|  |  |  | EOBLK (=0) |
|  |  |  | Refer to NOTE1 below |
| PICTURE_END | 0x1A | 1 w | end-of-picture flag. Indicates end of task. Must appear at the end of the symbol stream. |
| NOOP | 0x1F | 1 w | NOOP is ignored by the decoder. The lower 12 bits of this word may be used for diagnostics or any other purpose. One or more NOOP codes are allowed to appear only prior to the picture start code. |
|  | 0x1D |  | reserved |
|  | 0x1E |  | reserved |

To facilitate packing quantized coefficients in a 16-bit word, zero run length is encoded with 4 bits. Since the MPEG2 stream can specify run lengths of up to 63, this approach requires run lengths greater than 15 zeros to be split into multiple words; and sometimes results in coefficient taking a value of zero. For example, a sequence of 35 0s followed by a coefficient 27 will be encoded as: (15:0), (15:0), (5:27); where the first number in each pair is ZLEN, and the second number is COEFF. All bits that are unspecified or marked as 'reserved' should be read and written as '0'. ID CT_TYPE indicates three different ways of formatting the IDCT data. These are 16 bit signed, 9 bit signed packed, and data converted to 8 bit signed packed.

SYNCHRONIZATION OF AUDIO AND VIDEO DECODING TASKS

Software executing in CPU 112 is responsible for maintaining synchronization between the video and audio components of the MPEG video data stream. If video is running ahead of audio, the software delays issuing tasks to dedicated video hardware 118*b*; if video lags audio, software skips B-frame decode.

Dedicated video hardware 118*b* is restricted to displaying only those frames that have been completely decoded. This decode-before-display scheme ensures that interruptions during data transfer on system bus 11 do not result in corrupted images being displayed on the screen (tearing).

The decode-before-display constraint requires four frame stores in memory 118*a*, so that decode of one B-frame may proceed while the previous B-frame is being displayed to screen. Normally this requires 2.5 Megabytes of storage for YUV 4:2:0 PAL resolution pictures (576 lines). However, optimizations in accordance with the teachings of the current invention enable MPEG2 video decompression with only 2 Megabytes of RAM. This is accomplished by storing two reference frames (I/P) and three B-fields in frame buffer 118*a*, as described below. In accordance with the teachings of the current invention NTSC resolution pictures (480 lines) can be fullly stored by dedicated video hardware 118*b* with 2 Megabytes of RAM. This results in some loss of resolution or windowing for PAL pictures due to the physical memory limitation but its effect on video picture quality is minimal.

FRAME BUFFER DATA ORGANIZATION

As mentioned earlier, the current invention is capable of both MPEG 1 and MPEG 2 video decoding. In accordance with one embodiment of this invention, MPEG2 video decode is accomplished using 2 Megabytes of RAM, instead of 2.5 Megabytes required by conventional techniques, by innovative utilization of available memory space. This section discusses data organization in frame buffer 118*a* for NTSC & PAL resolution pictures, with 2 MB or less.

Ideally, the decode-before-display scheme requires at least four frame stores in frame buffer 118*a*. Storing four full frames requires approximately 2.5 Megabytes of RAM for PAL resolution pictures, and approximately 2 Megabytes of RAM for NTSC resolution pictures. An additional 53 Kilobytes of storage is needed to support the sub-picture feature described in the industry wide DVD specification. Table 2 and Table 3 describe storage requirements for NTSC & PAL resolution pictures, respectively, and the data organization in Frame Buffer 118*a* for four frame stores is shown in FIG. 9.

TABLE 2

Four Full Frame Stores — NTSC Pictures

| F0, F1, F2, F3 | Four frames for NTSC | 4 × 720 × 480 × 1.5 |
|---|---|---|

Total: 2073600 Bytes (23K less than 2 MB)

TABLE 3

Four Full Frame Stores — PAL Pictures

| F0, F1, F2, F3 | Four frames for PAL | 4 × 720 × 576 × 1.5 |
|---|---|---|

Total: 2488320 Bytes

If frame buffer 118*a* cannot accommodate all four full frame stores, MPEG2 decode is performed using two reference (I/P) frames, and three B picture fields, i.e., 3.5 Frame Stores, in frame buffer 118*a*. Of the three B-fields, one is allocated for Display, while the other two may be allocated for Decode, thus ensuring that no "tearing" of pictures occurs. This is illustrated in Table 4, Table 5, and FIG. 10.

TABLE 4

3.5 Frame Stores — PAL Pictures

| F0, F1 | Reference I/P Interlaced Frames | 2 × 720 × 576 × 1.5 |
|---|---|---|
| HF0, HF1, HF2 | 3 B-fields | 3 × 720 × 288 × 1.5 |

Total: 2177280 Bytes (>2 MB)

TABLE 5

3.5 Frame Stores — NTSC Pictures

| | | |
|---|---|---|
| F0, F1 | Reference I/P Interlaced Frames | 2 × 720 × 480 × 1.5 |
| HF0, HF1, HF2 | 3 B-fields | 3 × 720 × 240 × 1.5 |

Total: 1814400 Bytes

Figure 11:
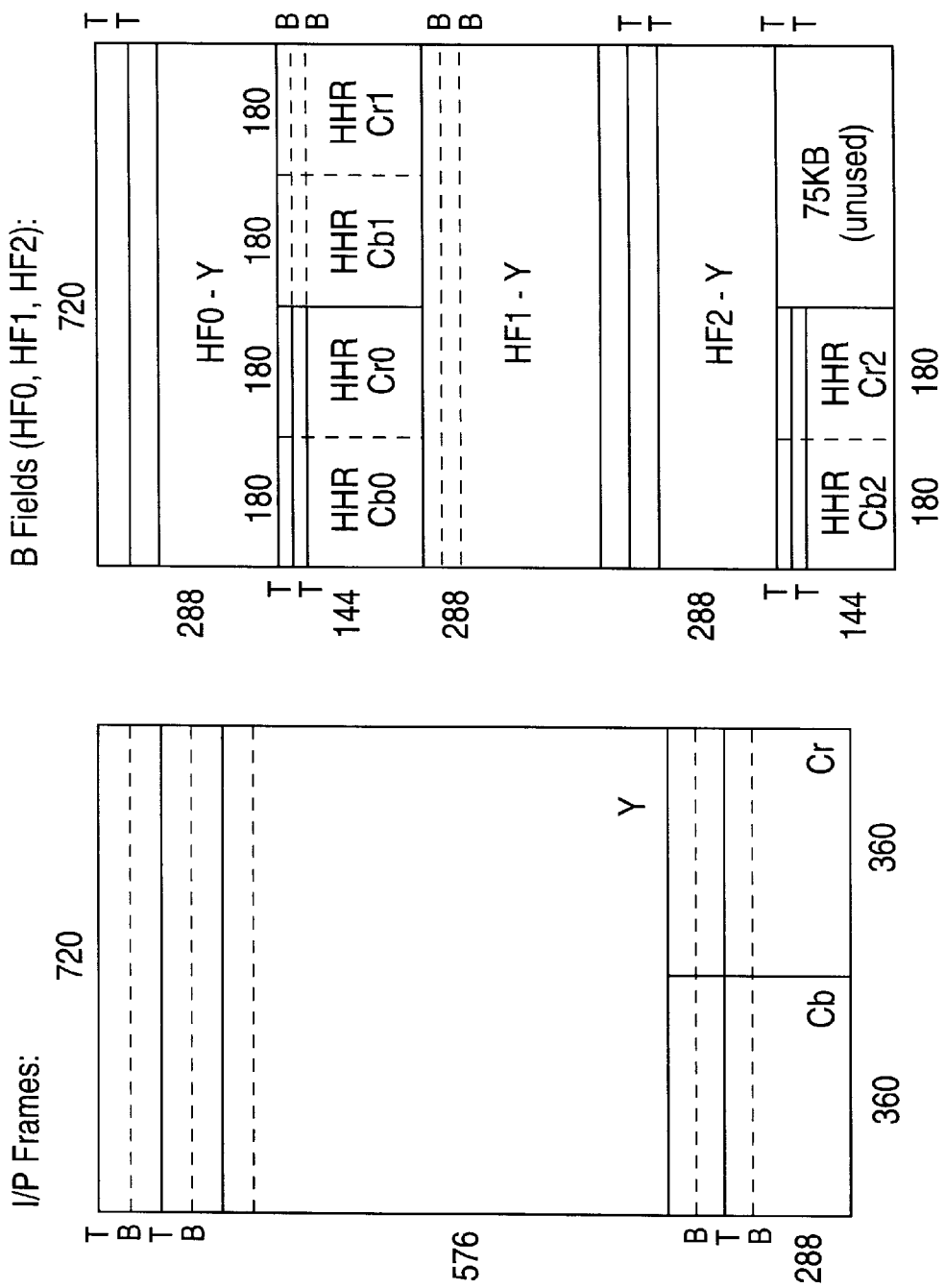
FIG. 11 depicts a frame buffer storage scheme to decode PAL pictures with only 2 MB of RAM.

For PAL format, the memory required to store 3.5 frame buffers is greater than the 2 MByte capacity of frame buffer 118a. Since many graphics cards ship with only 2 MB of RAM, dedicated video hardware 118b provides storage schemes to decode PAL pictures with only 2 MB of RAM as follows:

Scheme 1) Storing B-fields with Horizontal Half Resolution (HHR) for chrominance components. Cb, Cr components are sub-sampled by a factor of 2 in the horizontal direction, as shown in FIG. 11 and Table 6 (below).

TABLE 6

3.5 Frame Stores — PAL Pictures; HHR B-fields

| | | |
|---|---|---|
| F0, F1 | Reference I/P Interlaced Frames | 2 × 720 × 576 × 1.5 |
| HF0, HF1, HF2 | 3 B-fields, HHR Chrominance | 3 × 720 × 288 × 1.25 |

Total: 2021760 Bytes (75392 bytes spare)

Figure 12:
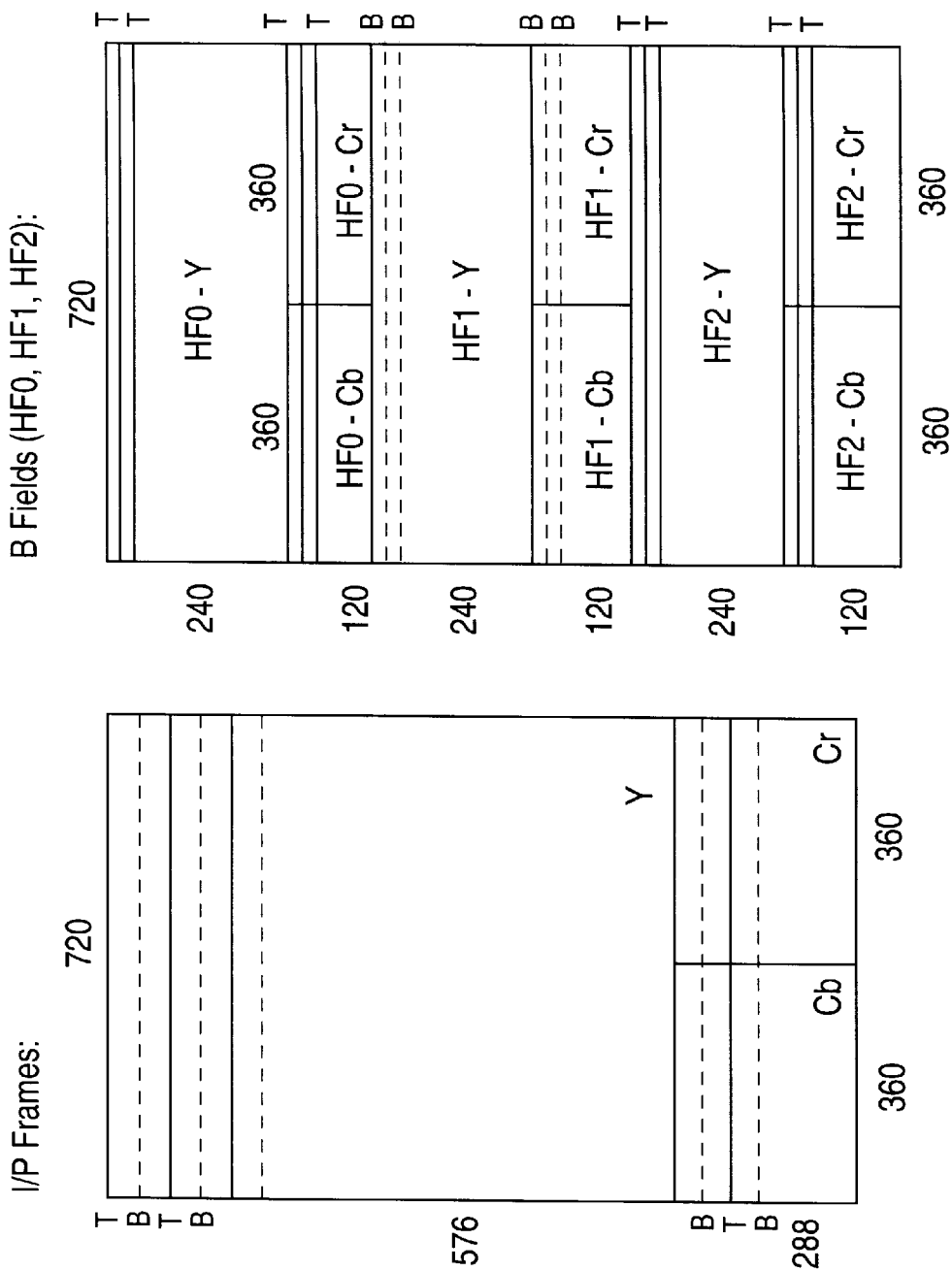
FIG. 12 depicts an alternate frame buffer storage scheme to decode PAL pictures with only 2 MB of RAM.

Scheme 2) As illustrated in FIG. 12 and Table 7 (below), store B-field Windows, each window having a resolution of 720×240, i.e., drop 48 lines per field. No sub-sampling of chrominance data is needed.

TABLE 7

3.5 Frame Stores — PAL Pictures; Windowed B-fields

| | | |
|---|---|---|
| F0, F1 | Reference I/P Interlaced Frames | 2 × 720 × 576 × 1.5 |
| HF0, HF1, HF2 | 3 720×240 Windowed B-fields | 3 × 720 × 240 × 1.5 |

Total: 2021760 Bytes (75392 bytes spare)

In all of the above embodiments, the reference frames (I/P) are always stored at their full resolution (720×576 for PAL and 720×480 for NTSC) in an interlaced format. Furthermore, in all the above embodiments, a constant stride (separation between vertically adjacent pixels) is maintained. Schemes 1 and 2 discussed above need to be used with a read-before-write (rbw) lock mechanism, because while decoding successive B-frames, the same region of memory is used simultaneously for display read of the previous frame, and decode write of the current frame. For example, with HHR B-fields (Scheme 1), the first B-frame, B1, is written into HF0 (top field), HF1 (bottom field). The following B-frame, B2, is written to HF0 (bottom), HF2 (top). The decode write of B2-bottom into HF0 should lag the display read of B1-top from HF0 (Scheme 2).

Table 8 shows how the software selects the appropriate storage scheme based on the amount of RAM available on the graphics card, resolution (NTSC/PAL), and other features to be supported, such as DVD sub-picture.

TABLE 8

Decode Storage Scheme Selection Table

| RAM on VGA Card | Resolution | DVD Sub-picture Support | FB Data Organization | Frame Stores in FB |
|---|---|---|---|---|
| >2.5 MB | NTSC/PAL | Yes | 4 Frame Stores | F0, F1, F2, F3 |
| 2 MB | NTSC | No | 4 Frame Stores | F0, F1, F2, F3 |
| 2 MB | NTSC | Yes | 3.5 Frame Stores | F0, F1, HF0, HF1, HF2 |
| 2 MB | PAL | Yes | 3.5 Frame Stores — Windowed or HHR | F0, F1, HF0, HF1, HF2 |

DISPLAY-DECODE SCHEDULING

This section discusses how decode and display tasks are scheduled in accordance with the teachings of this invention. This information is specified in the HTDP 154 which makes up part of the Task Data Structure.

HTDP Summary

Table 9 summarizes the contents of HTDP 154.

TABLE 9

HTDP content summary

| | |
|---|---|
| TaskType | Display only, or Decode-Display. |
| Sync | Start task on Top Sync, or Bottom Sync. |
| DecodeTaskCount | 1 for frame coded, 2 for field coded pictures. |
| DecodeBuffIndex | Index of buffer in which the decoded picture is to be written. |
| PictureType | 1 —> I, 2 —> P, 3 —> B pictures |
| DisplayTaskType | Options include display top field first, display bottom field first, or display frame. |
| DisplayBuffIndex | Index of buffer which is to be displayed. |
| DisplayPeriod | Number of VSYNC period for which the picture is to be displayed, this is used to repeat fields to match decode and display rates. |

In case of 3.5 buffer mode, the HTDP also specifies "read-before-write," or "write-before-read" locks if applicable.

To ensure consistently good video quality, the VGA refresh rates are, in one embodiment, constrained to be an integer multiple of the MPEG2 frame rate. Table 10 shows the display rate selection table.

TABLE 10

Display Rate Selection Table

| MPEG Frame Rate (frames per second) | Output Required | Display Rate (Hz) |
|---|---|---|
| 24 | PC-VGA | 72 |
| 24 | NTSC TV | 60 |
| 24 | PAL TV | 50 |
| 25 | PC-VGA | 75 |
| 25 | PAL TV | 50 |
| 30 | PC-VGA | 60 |
| 30 | NTSC TV | 60 |

Note: In the embodiment of Table 9, the display rate is always 2× or 3× the MPEG frame rate for PC-VGA display; 60 Hz for NTSC TV display; & 50 Hz for PAL TV display.

Constraints

The following constraints are imposed on the decoding process to ensure quality of video playback and to accomodate the decoding process in 2 megabytes or memory:

1) Decode of a frame must complete before display of that frame can begin. This ensures that the "tearing" of the video frame does not occur.

2) If top and bottom fields are displayed for unequal duration, the second field should be displayed longer. For example, if top and bottom fields are to be displayed for a total 3 VSYNCs, and the top field goes first, then display of top field should be scheduled for 1 VSYNC & that of bottom field for 2 VSYNCs. This ensures that memory is freed up faster for next decode task, while decoding back-to-back B-frames, using 3.5 frame stores in Frame Buffer.

3) Tasks are scheduled synchronously to display, i.e., a task is always started on a VSYNC. This helps prevent "tearing" artifacts during video display.

4) A time slice in the following discussion refers to one refresh period, i.e., the time between 2 successive VSYNCs.

5) If display device or hardware cannot support the desire refresh rate of 72 or 75 Hz, Software will step down the display rate to 60 Hz or 50 Hz, and if necessary, repeats frames, to achieve a 2x display rate. For example, play-back of 25 fps PAL material on 60 Hz display is accomplished by repeating 5 frames out of 25 frames every second. Similarly, display of 24 fps material on a 60 Hz display is done by repeating 6 frames out of 24 every second, and on a 50 Hz display, by repeating 1 frame out of 24 every second.

Dedicated Video Hardware Tasks

Software programs the following types of tasks to be performed by dedicated video hardware 118*b*:

1) Display Only Task: Time allocation field(s) in the HTDP specify the number of time slices that the frame or top & bottom fields should be displayed. Next task is started at the end of specified number of display time slices.

2) Decode & Display Task: Here a new frame or field is decoded into the specified buffers, while a previously decoded frame or filed is displayed. Time allocation field(s) in the HTDP specify the number of time slices that the frame or top & bottom fields should be displayed. Next task is started upon the completion of both decode & display tasks.

Decode Task Types

Decode tasks can be one of the following types depending on available system memory:

1) Decode Frame
2) Decode Two Fields

Decode Storage Scheme

Decode tasks allocate Frame Buffer memory in one of the following units:

1) 4 Frames
2) 3.5 Frames
3) 3.5 Frames—HHR B-fields
4) 3.5 Frames—Windowed B-fields Display Task Types Display tasks can be one of:

1) Display Progressive Frame
2) Display Frame as 2 Fields

Task Scheduling

Depending on the frame store organruation, interlaced/progressive video frame, and the display/decode rate, there are eight task scheduling schemes as summarized in Table 11:

TABLE 11

Scheduling Task Schemes

| | Frame Store | Display Frame Type Frame/Field | Display/Decode Rate |
|---|---|---|---|
| Example 1 | 3.5 Frame Store | Interlaced (Field) | 2X |
| Example 2 | 3.5 Frame Store | Interlaced (Field) | 3X |
| Example 3 | 4 Frame Store | Interlaced (Field) | 2X |
| Example 4 | 4 Frame Store | Interlaced (Field) | 3X |
| Example 5 | 4 Frame Store | Progressive (Frame) | 2X |
| Example 6 | 4 Frame Store | Progressive (Frame) | 3X |

The following examples illustrate decode & display of a group of pictures, for different display rate and storage schemes. The example described below corresponds to following decode sequence

I0 P3 B1 B2 P6 B4 B5 . . . .

Where I, P, and B represent the Intra, Predicted and Bi-directional Predicted picture types respectively. The numeric suffix is the frame number starting at 0.

2x and 3x indicate the ratio of the display rate to the encoded frame rate.

F0, F1, F2, F3 are the frame stores in the frame buffer. Suffix 't' and 'b' correspond to "top" and "bottom" fields respectively. HF0, HF1 and HF2 are half-frame stores in the frame buffer.

EXAMPLE 1

FIELD DISPL (2x Display rate)—3.5 Framne Stores

| I0—>F0 | P3—>F1 | B1—>HF0(t),HF1(b) | B2—>HF2(t),HF0(b) | P6—>F0 | B4 | |
|---|---|---|---|---|---|---|
| Display Task | I0t (F0t) | I0b (F0b) | B1t (HF0) | B1b (HF1) | B2t (HF0) | B2bs (HF2) | P3t (F1) | P3b (F1) |

EXAMPLE 2

FIELD DISPL (3x Display rate)—3.5 Frame Stores

| I0—>F0 | P4—>F1 | B1—>HF0(t),HF1(b) | | B2t—>HF2(t),HF0(b) | | B3—>HF1(t),HF2(b) | | P8—>F0 | | |
|---|---|---|---|---|---|---|---|---|---|---|
| Display Task | F0t (I0t) | F0b (I0b) | F1b (I0b) | HF0 (B1t) | HF1 (B1b) | HF1 (B1b) | HF2 (B2t) | HF0 (B2b) | HF0 (B2b) | HF1 (B3t) | HF1 (B3b) | HF2 (B3b) |

EXAMPLE 3

FIELD DISPL (2× Display rate)—4 Frame Stores

| I0—>F0 | P3—>F1 | | B1—>F2 | | B2—>F3 | | P3—>F0 | | B4—>F2 | |
|---|---|---|---|---|---|---|---|---|---|---|
| Display Task | I0t (F0t) | I0b (F0b) | B1t (F2t) | B1b (F2b) | B2t (F3t) | B2b (F3b) | P3t (P1t) | P3b (F1b) | | |

EXAMPLE 4

FIELD DISPL (3× Display Rate)—4 Frame Stores

| I0—>F0 | P3—>F1 | | B1—>F2 | | | B2—>F3 | | | P6—>F0 | | | B4—>F2 | | |
|---|---|---|---|---|---|---|---|---|---|---|---|---|---|---|
| Display Task | F0t (I0t) | F0b | F0b | F2t (B1t) | F2b | F2b | F3t (B2t) | F3b | F3b | F1t (P3t) | F1b | F1b | | |

EXAMPLE 5

(Progressive) FRAME DISPL (2× Display rate)—4 Frame Stores

| I0—>F0 | P3—>F1 | | B1—>F2 | | B2—>F3 | | P3—>F0 | | B4—>F2 | |
|---|---|---|---|---|---|---|---|---|---|---|
| Display Task | I0 (F0) | I0 (F0) | B1 (F2) | B1 (F2) | B2 (F3) | B2 (F3) | P3 (F1) | P3 (F1) | | |

EXAMPLE 6

(Progressive) FRAME DISP (3× Display rate)—4 Frame Stores

| I0—>F0 | P3—>F1 | | B1—>F2 | | | B2—>F3 | | | P6—>F0 | | | B4—>F2 | | |
|---|---|---|---|---|---|---|---|---|---|---|---|---|---|---|
| Display Task | F0 (I0) | F0 | F0 | F2 (B1) | F2 | F2 | F3 (B2) | F3 | F3 | F1 (P3) | F1 | F1 | | |

Example of a Task:
Decode of a B Frame for 3.5 Buffer Storage, and Field Display
Decode Storage Scheme: 3.5 Buffer
Decode BUF1: HF0
Decode BUF2: HF1
Display Type: Display as Fields
Display Buffer id: F0
First Display: Bottom Field
Display Duration for the first field: 1
Display Duratio for the second field: 2
In the case of 3.5 Buffer organization, while decoding a B Frame, Display and Decode Buffer may overlap. In this case hardware lock of either display-before-decode or decode-before-display memory read/write lock is required. This information is also provided as part of the task.

ALTERNATE EMBODIMENTS OF DEDICATED VIDEO HARDWARE

Figure 13:
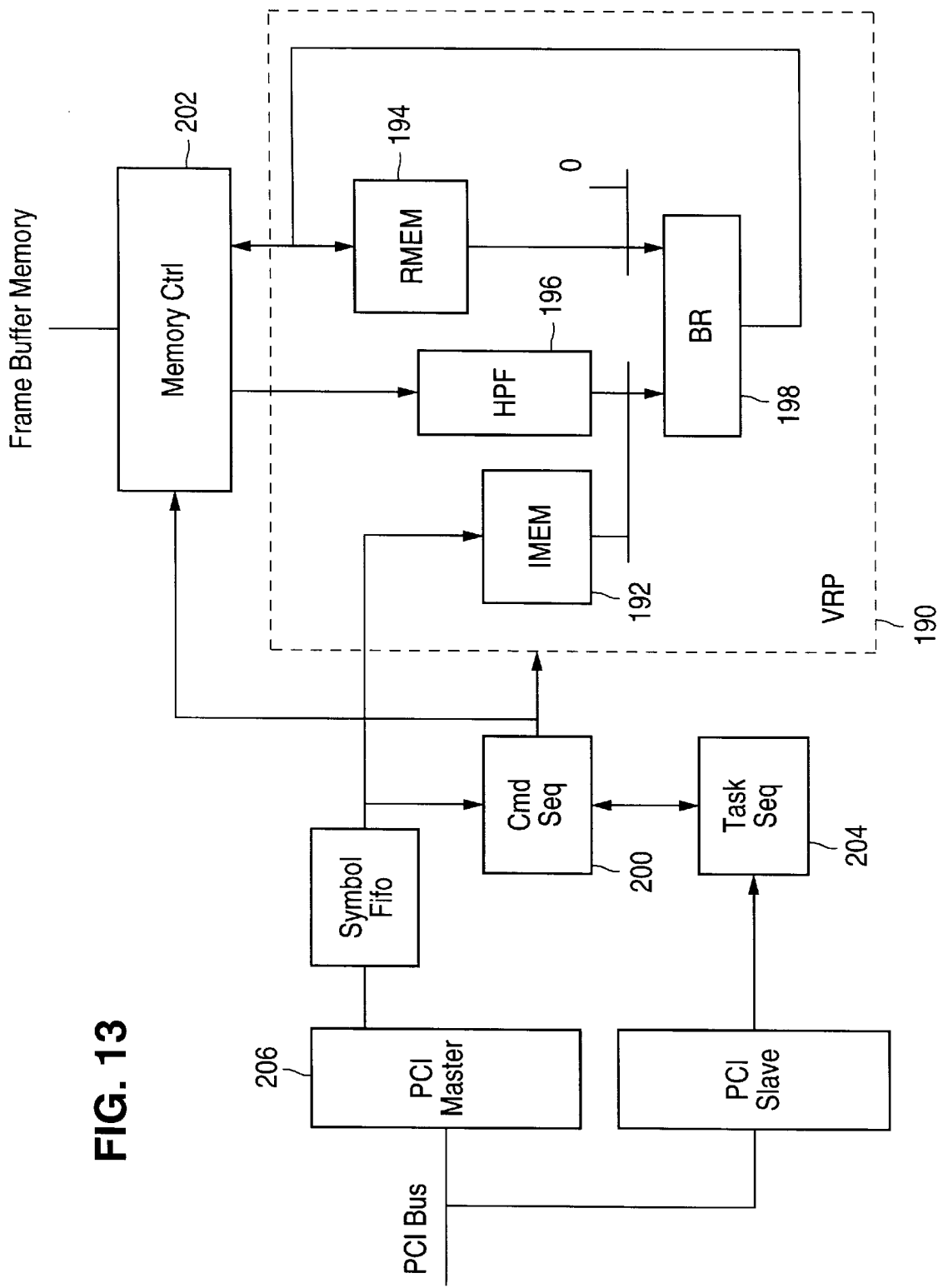
FIG. 13 depicts an embodiment of the current invention in which the dedicated video hardware is embedded in the graphics controller.

The following section describes alternate embodiments of dedicated video hardware 118b and data flows for performing motion compensation and the block reconstruction tasks. FIG. 13 depicts an embodiment in accordance with the teachings of the current invention in which dedicated video hardware 118b is embedded in graphics controller 118. In the embodiment depicted in FIG. 13, dedicated video hardware 118b performs the tasks of motion compensation (MC) and block reconstruction (BR) (similar to the decode task partitioning shown in FIG. 4). FIG. 14 depicts the data flow diagram for MPEG decode task performed by dedicated video hardware 118b depicted in FIG. 13.

As shown in FIG. 13, the dedicated video hardware embedded in the graphics controller is called Video Reconstruction Processor (VRP) 190. VRP 190 comprises on-chip memory buffer (IMEM) 192 to store data related to the IDCT operation, memory buffer (RMEM) 194 to store data related to the motion compensation (MC) operation, half pixel filter (HPF) 196 to perform half pixel interpolation, and block resonstruction block 198 to perform block reconstruction computation of the video frames. VRP 190 interfaces with command sequencer 200 and memory controller 202 which controls access to the frame buffer of graphics controller 118.

Task sequencer 204 reads the Task Fifo and fetches the HTDP. Task sequencer 204 uses the HTDP values to program control registers in VRP 190. This includes programming one register with the start pointer of the symbol stream buffer in the system memory 14.

Task execution begins on assertion of the VSYNC signal. PCI bus mastering logic 206 starts reading symbol fifo from the system memory into the onchip symbol fifo. Command sequencer 200 interprets the fixed length command and starts parsing the symbols according to the syntax described previously. Command sequencer 200 acts as a master and sends commands and data to memory controller 202, VRP 190 for each macroblock at a time. Afer all macroblocks in a given frame have been processed, task sequencer 204 generates an interrupt to indicate the completion of the task and begins processing the next task.

VRP 190 operates in a "slave" mode to command sequencer 200 which acts as a "master"—command sequencer 200 loads a command into VRP 190, which is then executed by VRP 190. After executing the command, VRP 190 waits for another command to be loaded by command sequencer 200. To process a macroblock, command sequencer 200 issues three commands—one command for the four luminance (Y) blocks, and one command each for the two chrominance blocks (Cb and Cr). VRP 190 fetches the reference macroblocks from local memory 194, does half pixel interpolation (if necessary) using HPF 196 and combines the reference macroblocks to form a prediction macroblock using BR. VRP 190 also extracts IDCT values from the symbol stream and the extracted values in onchip memory buffer IMEM 192. VRP 190 then combines the results of these two operations to generate the reconstructed macroblock using BR, which is written to the destination frame buffer using memory controller 202.

For example, consider the case when VRP 190 is processing a luminance(Y) block that has IDCT values and also has one forward (A-Ref) and one backward(B-Ref) motion vector. Command sequencer 200 extracts forward and backward reference addresses from the symbol stream and writes then to appropriate registers in memory controller 202. In an alternate embodiment, command sequencer 200 also computes the destination address of the Y block. Command sequencer 200 then loads a command packet into VRP 190, which instructs VRP 190 how to process the block. Next, command sequencer 200 extracts IDCT data and loads it into IMEM 192. Concurrently, the motion compensation engine starts fetching the forward reference block into RMEM 194. Half pixel interpolation, if needed, is done "on the fly" by HPF 196, as the reference block is being fetched from the memory. Once the forward reference block has been fetched, VRP 190 starts fetching the backward reference block from memory. At this time, VRP 190 averages the forward and backward reference pixel values "on the fly" as the backward reference data is being read from the memory. At the end of the operation, the prediction block is stored in RMEM 194 (as shown in FIG. 14).

At this time, the IDCT engine and the motion compensation engine need to synchronize, in the sense that whoever gets done earlier, has to wait for the other to finish. FIG. 15 depicts the situation where the motion compensation task finishes before the IDCT task and thus has to wait for the IDCT values to be fully loaded into IMEM 192. Finally, VRP 190 combines the result of the IDCT and motion compensation tasks to reconstruct the decoded Y block on the fly using BR and sent to memory controller 202, which is then written back to RMEM 194. For a "Y" block, the IDCT engine extracts up to four 8×8 IDCT values for each of the four luminance blocks. The number of "Y" 8×8 IDCT blocks present within a macroblock depends on the pattern symbol. For the 8×8 "Y" blocks which are not present in the symbol stream, the IDCT engine writes zeros as IDCT values. FIG. shows the case when the IDCT task finishes before the motion compensation task.

FIG. 17 depicts the data flow diagram for the alternate embodiment of dedicated video hardware 118b. As illustrated in FIG. 17, IDCT values are combined first with the forward (A-REF) reference block. The resulting data is then averaged with backward (B-REF) block. This implementation helps save IMEM.

The invention now being fully described, it will be apparent to one of ordinary skill in the art that many changes and modifications can be made thereto without departing from the spirit or scope of the appended claims. All publications and patent applications mentioned in this specification are herein incorporated by reference to the same extent as if each individual publication or patent application was specifically and individually indicated to be incorporated by reference.

What is claimed:

1. A method to decode an encoded MPEG video data stream, said method comprising the steps of:
    partitioning said decode of said encoded MPEG video data stream into memory-compute intensive tasks which require extensive memory and computational resources and non memory-compute intensive tasks which do not require extensive memory or computational resources;
    performing said non memory-compute intensive tasks through software modules executing on a processor to produce preprocessed symbol stream datastructure for each video frame, comprising the steps of:
        parsing said encoded MPEG video data stream using variable length decoding to produce parsed video data stream;
        performing inverse quantization on said parsed video data stream to produce said quantized video data stream;
        formatting said quantized video data stream as said preprocessed symbol stream datastructure; and
        writing said preprocessed symbol stream datastructure to said memory buffer;
    storing said preprocessed symbol stream data structure in a memory buffer;
    performing said memory-compute intensive tasks in dedicated video hardware to produce a decoded video frame;
    synchronizing said non memory-compute intensive tasks performed through said software modules executed by said processor and said memory-compute intensive tasks performed by said dedicated video hardware; and
    displaying said decoded video frame on a display device.

2. A method to decode an encoded MPEG video data stream, said method comprising the steps of:
    portioning said decode of said encoded MPEG video data stream into memocompute intensive tasks which require extensive memory and computational resources and non memory-compute intensive tasks which do not require extensive memory or computational resources;
    performing said non memory-compute intensive tasks through software modules executing on a processor to produce preprocessed symbol stream datastructure for each video frame, comprising the steps of:
        parsing said encoded MPEG video data stream using variable length decoding to produce parsed video data stream;
        performing inverse quantization on said parsed video data stream to produce said quantized video data stream;
        performing inverse discrete cosine transformation on said quantized video data stream to produce cosine transformed video data stream;
        formatting said cosine transformed video data stream as said preprocessed symbol stream datastructure; and
        writing said preprocessed symbol stream datastructure to said memory buffer;
    storing said preprocessed symbol stream data structure in a memory buffer;
    performing said memory-compute intensive tasks in dedicated video hardware to produce a decoded video frame;
    synchronizing said non memory-compute intensive tasks performed through said software modules executed by said processor and said memory-compute intensive tasks performed by said dedicated video hardware; and
    displaying said decoded video frame on a display device.

3. The method of claims 1 or 2, wherein said step of performing said memory-compute intensive tasks in said dedicated video hardware to produce said decoded video frame comprises the steps of:

accessing said preprocessed symbol stream datastructure stored in said memory buffer;

performing motion compensation operation on said preprocessed symbol stream datastructure to produce compensated video data stream; and performing block reconstruction operation on said compensated video data stream to produce said decoded video frame.

4. The method of claims 1 or 2, wherein said step of performing said memory-compute intensive tasks in said dedicated video hardware to produce said decoded video frame comprises the steps of:

accessing said preprocessed symbol stream datastructure stored in said memory buffer;

performing inverse discrete cosine transformation operation on said preprocessed symbol stream datastructure to produce cosine transformed video data stream;

performing motion compensation operation on said cosine transformed video data stream to produce compensated video data stream; and performing block reconstruction operation on said compensated video data stream to produce said decoded video frame.

5. The method of claims 1 or 2, wherein said step of synchronizing said non-memory intensive tasks performed through said software modules executed by said processor and said memory-compute intensive tasks performed by said dedicated video hardware comprises the steps of:

allocating said memory buffer to store said preprocessed symbol stream datastructure;

maintaining a task pointer queue of software task control datastructures, each one of said software task control datastructures storing control information corresponding to each said non memory-compute intensive task processed by said software modules which is ready to be scheduled as said memory-compute intensive task to be executed by said dedicated video hardware;

maintaining a count of completed said non memory-compute intensive tasks;

converting said software control datastructures to hardware task control datastructures, said hardware task control datastructures storing information corresponding to said memory-compute intensive task to be executed by said dedicated video hardware;

maintaining a task FIFO queue of said hardware task control datastructures in said dedicated video hardware, each of said hardware task control datastructure in said task FIFO queue storing information regarding said memory-compute intensive task to be executed by said dedicated video hardware;

issuing an interrupt to signal completion of said memory-compute intensive task by said dedicated video hardware; and said software modules popping said hardware task control datastructure from said task FIFO queue on receiving said interrupt, said popped hardware task control datastructure corresponding to said memory-compute intensive task completed by said dedicated video hardware.

6. An apparatus for decoding an encoded MPEG video data stream by partitioning said decoding into non memory-compute intensive tasks and memory-compute intensive tasks, said apparatus comprising:

a bus interace;

a processor coupled to said bus interface, said processor configured to execute one or more software modules of said plurality of software modules stored in said system memory to:

parse said encoded MPEG video stream using variable length decoding to produce parsed video data stream;

perform inverse quantization on said parsed video data stream to produce said quantized video data stream;

format said quantized video data stream as said preprocessed symbol stream datastructure; and store said preprocessed symbol stream datastructure in said system memory;

a system memory coupled to said bus interface, said system memory configured to store a plurality of software modules which can he executed on said processor, one or more software modules of said plurality of software modules configured to perform said non memory-compute intensive tasks to produce preprocessed symbol stream datastructure;

dedicated video hardware coupled to said bus interface, said dedicated video hardware configured to execute said memory-compute intensive tasks to produce decoded video data to be display on a display device; and dedicated memory coupled to said dedicated video hardware.

7. An apparatus for decoding an encoded MPEG video data stream by partitioning said decoding into non memory-compute intensive tasks and memory-compute intensive tasks, said apparatus comprising:

a bus interface;

a processor coupled to said bus interface, said processor configured to execute one or more software modules of said plurality of software modules stored in said system memory to:

parse said encoded MPEG video stream using variable length decoding to produce parsed video data stream;

perform inverse quantization on said parsed video data stream to produce said quantized video data stream;

perform inverse discrete cosine transformation on said quantized video data stream to produce cosine transformed video data stream;

format said cosine transformed video data stream as said preprocessed symbol stream datastructure; and store said preprocessed symbol stream datastructure in said system memory;

a system memory coupled to said bus interface, said system memory configured to store a plurality of software modules which can be executed on said processor, one or more software modules of said plurality of software modules configured to perform said non memory-compute intensive tasks to produce preprocessed symbol stream datastructure;

dedicated video hardware coupled to said bus interface, said dedicated video hardware configured to execute said memory-compute intensive tasks to produce decoded video data to be display on a display device; and dedicated memory coupled to said dedicated video hardware.

8. The apparatus of claims 6 or 7, wherein said dedicated video hardware is further configured to:

read said preprocessed symbol stream datastructure stored in said system memory;

perform motion compensation on said preprocessed symbol stream data to produce compensated video data stream; and perform block reconstruction operation on said compensated video data stream to produce said decoded video data.

9. The apparatus of claims 6 or 7, wherein said dedicated video hardware is further configured to:
   read said preprocessed symbol stream datastructure stored in said system memory;
   perform inverse discrete cosine transformation operation on said preprocessed symbol stream datastructure to produce cosine transformed video data stream;
   perform motion compensation on said cosine transformed video data stream to produce compensated video data stream; and
   perform block reconstruction operation on said compensated video data stream to produce said decoded video data.

10. The apparatus of claims 6 or 7, wherein
   one or more software modules of said plurality of software modules stored in said system memory are further configured to:
      allocate a memory buffer for said preprocessed symbol stream datastructure in said system memory;
      maintain a task pointer queue of software task control datastructures, each one of said software task control datastructures storing control information corresponding to each said non memory-compute intensive task processed by said software module which is ready to be scheduled as said memory-compute intensive task to be executed by said dedicated video hardware;
      maintain a count of completed said non memory-compute intensive tasks;
      convert said software control datastructures to hardware task control datastructures, said hardware task control datastructures to store information corresponding to said memory-compute intensive task to be executed by said dedicated video hardware; and
   said dedicated video hardware is further configured to:
      maintain a task FIFO queue of said hardware task control datastructures in said dedicated memory, each of said hardware task control data packet in said task FIFO queue to store information regarding said memory-compute intensive task to be executed by said dedicated video hardware; and
      issue an interrupt to signal completion of said memory-compute intensive task by said dedicated video hardware, said software module configured to pop said hardware task control datastructure from said task FIFO queue on receiving said interrupt, said popped hardware task control datastructure corresponding to said memory-compute intensive task completed by said dedicated video hardware.

* * * * *